United States Patent [19]

Molino

[11] 3,724,250
[45] Apr. 3, 1973

[54] ROLLING AND BEADING MACHINE

[76] Inventor: Angelo R. Molino, Landmark Apartments, Cherry Hill, N.J. 08034

[22] Filed: Oct. 4, 1971

[21] Appl. No.: 186,295

[52] U.S. Cl. ................................72/171, 72/175
[51] Int. Cl. ..................................................B21d 5/14
[58] Field of Search........72/170, 171, 172, 173, 175, 72/168, 169

[56] References Cited

UNITED STATES PATENTS

| | | | |
|---|---|---|---|
| 3,319,445 | 5/1967 | Stalker | 72/171 X |
| 801,489 | 10/1905 | Kaplan | 72/168 X |
| 2,049,173 | 7/1936 | Parcells | 72/168 |
| 947,291 | 1/1910 | Berghausen | 72/170 |
| 469,763 | 3/1892 | Williams | 72/170 X |

*Primary Examiner*—Milton S. Mehr
*Attorney*—Jacob Trachtman

[57] ABSTRACT

Forming apparatus for forming a sheet of metal preform into a tubular duct. The forming apparatus includes three parallel rollers adapted to bend the preform into a tubular shape as the preform passes between the rollers. The rollers also include mating forming ribs adjacent one end thereof for forming a bead on the end of the tubular member simultaneously with the bending of the preform into the tubular shape. A table is provided in front of the rollers to facilitate feeding the preform between the rollers. On the table are separate guide means for guiding the preform between the rollers. One guide means is adjacent the forming ribs to be used to form a tubular member with a bead on one end. The other guide means is located intermediate the ends of the rollers to be used to form a tubular member without a bead.

3 Claims, 9 Drawing Figures

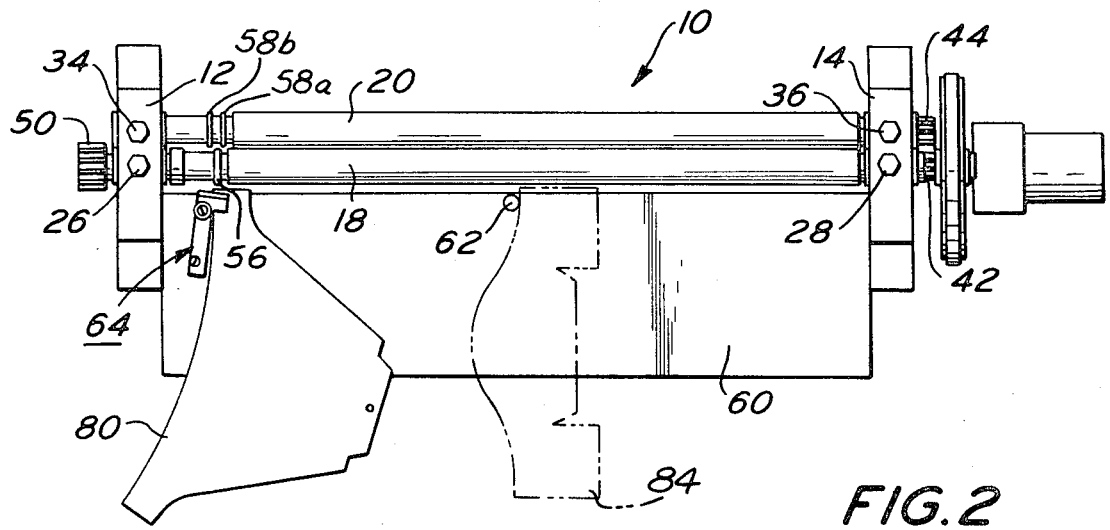
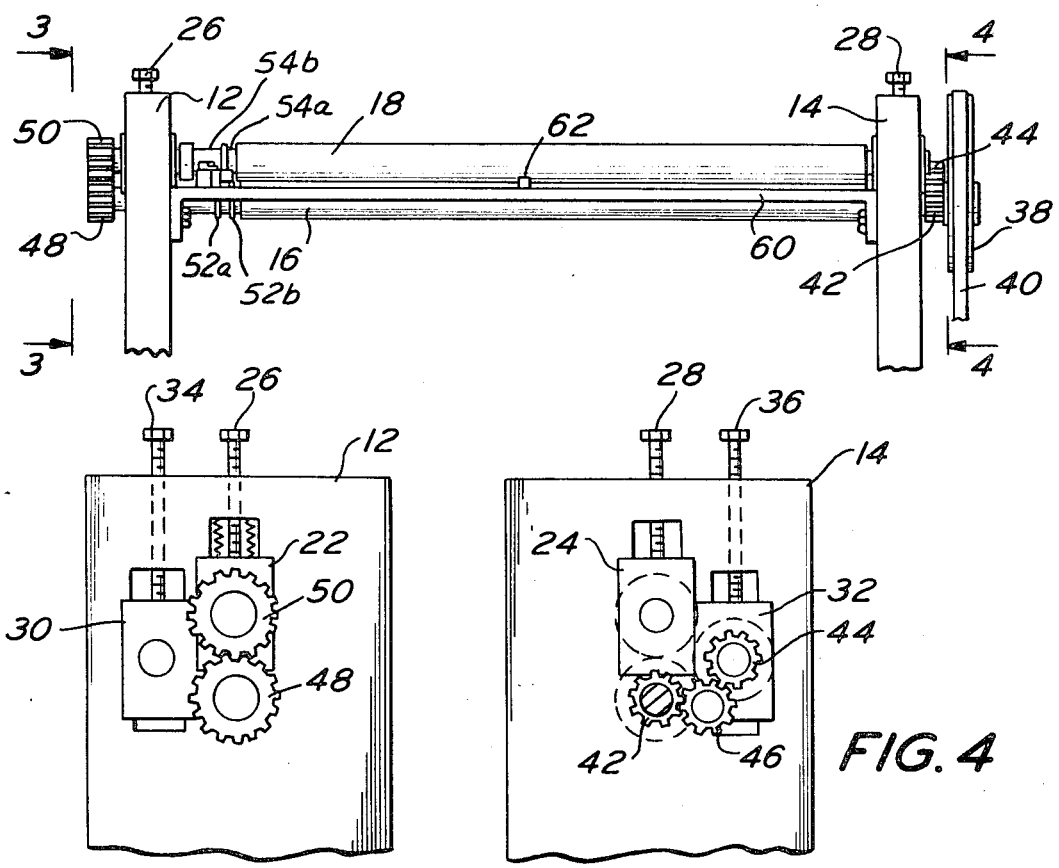

INVENTOR
ANGELO R. MOLINO

BY Jacob Trachtman

ATTORNEY

ROLLING AND BEADING MACHINE

The present invention relates to a sheet metal forming apparatus, and more particularly to an apparatus for forming a sheet metal preform into a tubular duct either with or without a bead on one end thereof.

Duct systems, such as used in heating, ventilating and air conditioning systems, are generally made up of sheet metal ducts of various shapes and sizes, including tubular ducts. Some of the tubular ducts require beaded ends to permit the duct to be easily connected to other ducts. Generally, the end of the duct is beaded after the duct has been formed in the tubular shape. However, this has the disadvantage that it requires two separate operations using two separate pieces of equipment to make the duct. Some of the tubular ducts require odd shaped ends to permit the duct to be connected either to an odd shaped opening or to another duct at an angle. Generally such odd shaped ends have been formed on the duct after it is in tubular shape. However, to so cut the end of a tubular duct can be difficult.

It is therefore an object of the present invention to provide a novel sheet metal duct forming apparatus.

It is another object of the present invention to provide a sheet metal duct forming apparatus which forms a bead in an end of the duct simultaneously with forming the duct in tubular form.

It is still another object of the present invention to provide a sheet metal duct forming apparatus which will easily form a sheet metal preform having a curved edge into tubular form.

It is a further object of the present invention to provide a sheet metal tubular duct forming apparatus which includes guide means for automatically guiding a sheet metal preform between the forming rolls of the apparatus.

Other objects will appear hereinafter.

Referring to the drawings wherein like reference numerals refer to like parts.

FIG. 1 is a top plan view of the forming apparatus of the present invention;

FIG. 2 is a front plan view of the forming apparatus;

FIG. 3 is an end view of the forming apparatus taken along line 3—3 of FIG. 2;

FIG. 4 is a sectional view taken along 4—4 of FIG. 2;

Figure 5:
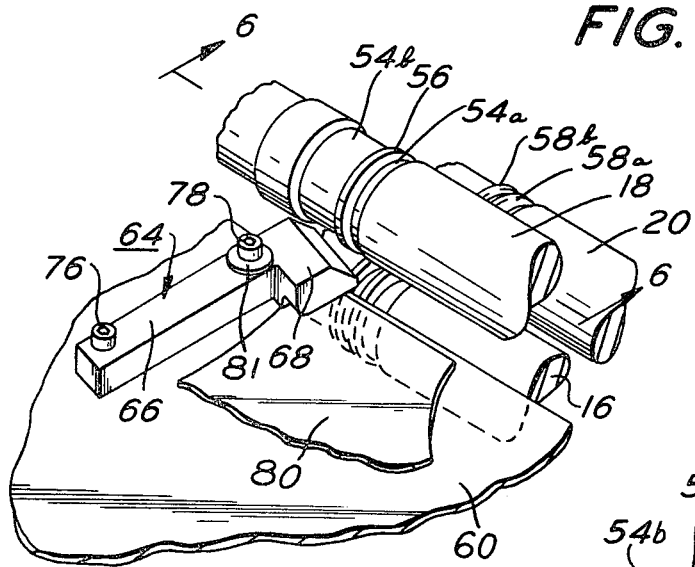
FIG. 5 is a perspective view of the end of the apparatus which forms the bead on the end of the duct.

Referring initially to FIGS. 1-4, the forming apparatus of the present invention is generally designated as 10. The forming apparatus 10 comprises a pair of spaced, parallel, vertically extending support plates 12 and 14. Three cylindrical rollers 16, 18 and 20 extend in parallel relation between and are rotatably supported on the support plates 12 and 14. The roller 18 is mounted vertically directly above the roller 16. The ends of the roller 18 are mounted in vertically movable bearing blocks 22 and 24 (See FIGS. 3 and 4). Adjustment screws 26 and 28 are threaded through the support plates 12 and 14 respectively and are connected to the bearing blocks 22 and 24 respectively. The adjustment screws 26 and 28 permit the bearing blocks 22 and 24 to be moved vertically so as to adjust the spacing between the rollers 16 and 18. The roller 20 is mounted behind and extends along the space between the rollers 16 and 18. The ends of the roller 20 are mounted in vertically movable bearing blocks 30 and 32 (See FIGS. 3 and 4). Adjustment screws 34 and 36 are threaded through the support plates 12 and 14 respectively and are connected to the bearing blocks 30 and 32 respectively. The adjustment screws 34 and 36 permit the adjustment of the vertical position of the roller 20.

The roller 16 is rotated through a pulley 38 which is mounted on the end of the roller 16 which projects through and extends beyond the support plate 14. The pulley is drivingly connected by an endless belt 40 to a source of power, such as a motor, not shown. A gear 42 is also mounted on the end of the roller 16 between the pulley 38 and the support plate 14. The gear 42 drives a gear 44 on the adjacent end of the roller 20 through an idler gear 46 rotatably mounted on the support plate 14 (See FIG. 4). Thus, rotation of the roller 16 rotates the roller 20 in the same direction as the roller 16. A gear 48 is mounted on the end of the roller 16 which projects through and extends beyond the end of the support plate 12. The gear 48 meshes with a gear 50 on the adjacent end of the roller 18 (See FIG. 3). Thus, rotation of the roller 16 rotates the roller 18 in the direction opposite to the roller 16.

The roller 16 has thereon a pair of closely spaced, annular forming ribs 52a and 52b adjacent the inner surface of the support plate 12. The roller 18 has therein a pair of closely spaced, annular grooves 54a 54b forming an annular rib 56 therebetween. The grooves 54a and 54b are positioned directly opposite the ribs 52a and 52b on the roller 16. The ribs 52a and 52b extend slightly into the grooves 54a and 54b respectively so that the rib 56 extends slightly between the ribs 52a and 52b (See FIG. 6). The roller 20 also has a pair of closely spaced, annular ribs 58a and 58b thereon which extend slightly into the grooves 54a and 54b in the roller 18.

A table 60 extends horizontally between and is secured to the support plates 12 and 14. The table 60 is in front of the rollers 16 and 18 and is positioned with its top surface being in a plane which is substantially tangent to the uppermost point of the roller 16. A cylindrical guide post 62 extends vertically upwardly from the table 60 at the back edge of and intermediate the side edges of the table 60.

Figure 7:
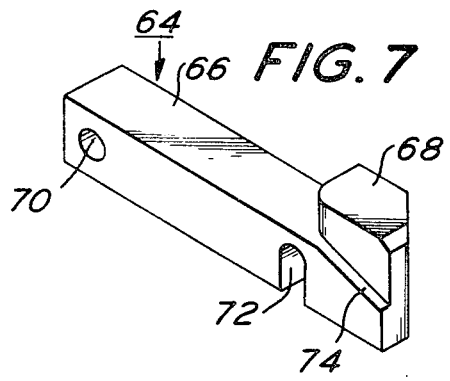
FIG. 7 is a perspective view of one of the guide means of the apparatus.

A guide member 64 is mounted on the table 60 adjacent the end of the roller 16 having the forming ribs 52a and 52b. The guide member 64 has an elongated mounting arm 66 and a guide head 68 on one end of the mounting arm 66 (see FIG. 7). The mounting arm 66 has a mounting hole 70 therethrough adjacent its end away from the guide head 68. A mounting slot 72 is provided in a side edge of the mounting arm 66 adjacent the guide head 68. The guide head 68 is wider than the mounting arm 66 and projects beyond a side edge of the mounting arm. The bottom of the portion of the guide head 68 which projects beyond the side of the mounting arm 66 is undercut to provide a vertical guide wall 74 which extends along the bottom of the guide head at an angle with respect to the mounting arm.

The guide member 64 is secured to the table 60 by a pair of headed screws 76 and 78 which extend through the mounting hole 70 and mounting slot 72 respectively and are threaded into holes in the table 60. A washer 81 is provided between the head of the screw 78 and the mounting arm 66 of the guide member 64. The guide member 64 is positioned with the guide head 68 being adjacent the rollers 16 and 18 and the mounting arm 66 extending at a slight angle away from the rollers toward the adjacent side edge of the table 60. The angle of the guide member 60 is such that the guide wall 74 extends substantially perpendicular to the rollers at the forming rib 52a on the roller 16.

Figure 6:
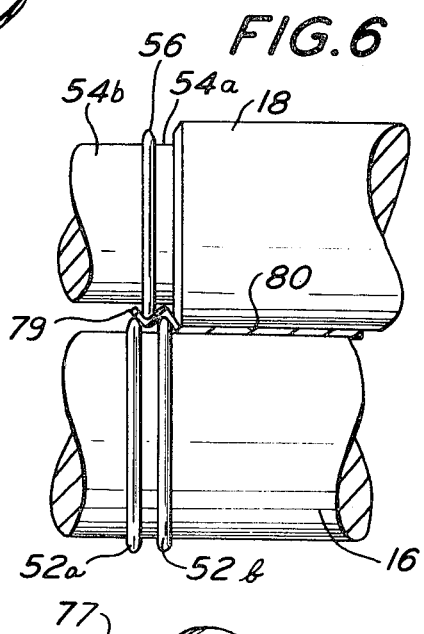
FIG. 6 is a sectional view taken along line 6—6 of FIG. 5.
Figure 8:
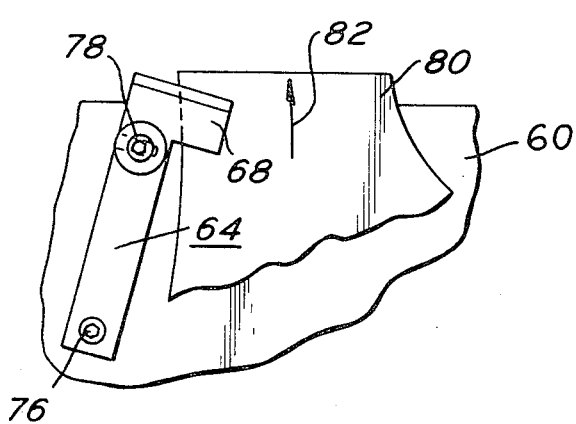
FIG. 8 is a top plane view showing the manner of operation of the guide means shown in FIG. 7.
Figure 9:
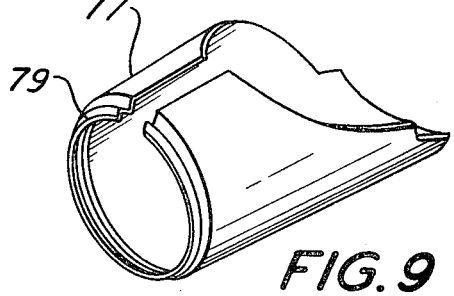
FIG. 9 is a perspective view of a sheet metal duct formed by the apparatus of the present invention.

The apparatus 10 of the present invention can be used to form a sheet metal tubular duct with or without a bead on one end. To form a duct with a bead on one end, such as the duct 77 shown in FIG. 9 with a bead 79 on one end, a sheet metal preform 80 of the desired shape is placed on the table 60 as shown in FIGS. 1, 5 and 8. The preform 80 is positioned with the edge to be beaded extending under the guide head 68 and engaging the guide wall 74. With the edge of the preform engaging the guide wall 74, the preform 80 is slid forward on the table 60 as indicated by the arrow 82 in FIG. 8 until it extends between and is engaged by the rollers 16 and 18. The rollers 16 and 18 are rotated in the direction such that when the preform is engaged by the rollers 16 and 18, the rollers automatically pull the preform between the rollers 16 and 18 toward the roller 20. As the preform 80 passes between the rollers 16 and 18, the edge portion of the preform is engaged by the ribs 52a and 52b of the roller 16 and the rib 56 of the roller 18 to bend the edge of the preform into the form of a bead 79 as shown in FIG. 6. After the preform 80 passes from between the rollers 16 and 18, it engages the roller 20 which bends the preform upwardly around the roller 18 to form the preform into a tubular shape. Thus, once the leading edge of the preform is fed between the rollers 16 and 18, the preform is automatically completely passed between the rollers 16, 18 and 20 to shape it into tubular form and from a bead on the edge of the preform. The guide member 64 automatically properly guides the preform between the rollers so that the bead 79 is properly formed on the end of the tubular duct 77.

To form a tubular duct without a bead, a sheet metal preform 84 of the desired shape, shown by dashed lines in FIG. 1, is placed on the table 60 with an edge engaging the guide post 62. The preform 84 is slid forwardly until it passes between and is engaged by the rollers 16 and 18. The rollers 16 and 18 then continue to pull the preform 84 between the rollers with the guide post 62 engaging the edge of the preform to properly guide it between the rollers. After the preform passes from between the rollers 16 and 18, it engages the roller 20 which bends the preform upwardly around the roller 18 so as to form the preform into a tubular shape. Thus, once the leading edge of the preform is engaged by the rollers 16 and 18, the preform is automatically completely passed between the rollers 16, 18 and 20 to form it into a tubular shape. The guide post 62 properly guides the preform between the rollers 16 and 18 and does so even through the edge of the preform is curved as shown in FIG. 1.

Thus, there is provided by the present invention a forming apparatus which quickly bends a sheet metal preform into a tubular duct either with or without a bead on one end of the duct. When provided with a bead, the bead is formed on the duct simultaneously with the bending of the preform into the tubular duct. The forming apparatus also includes guide means which accurately guide the sheet metal preform between the forming rollers and can do so even if the edge of the preform is curved.

I claim:

1. Apparatus for forming a sheet metal preform into tubular shape comprising roller means for bending the preform into a tubular shape as the preform passes between the roller means, and guide means for engaging an edge of the preform and guiding the preform between said roller means, the roller means comprising three cylindrical rollers arranged in closely spaced parallel relation with the longitudinal axes of two of the rollers lying in the same plane and the longitudinal axis of the third roller lying in a different plane and extending along the space between the two rollers, said rollers including thereon mating forming means adjacent one end thereof for forming a bead on the preform as the preform passes between said rollers, said bead forming means including a pair of closely spaced annular forming ribs on each of one of said two rollers and the third roller, and an annular forming rib on the other of said two rollers which extends slightly between the pair of ribs on each of the one and the third roller, said rollers extending horizontally between and being rotatably mounted on a pair of spaced vertically extending supports with the two rollers being arranged one vertically above the other and the third roller being behind the two rollers, a table extends horizontally between and is mounted on said supports in front of said two rollers with the top surface of said table being substantially tangent to the uppermost point of the lower of the two rollers, and the guide means being on the table and including a guide member mounted on the top of the table adjacent to the forming ribs of said rollers, the guide member including a mounting arm and a guide head on an end of the mounting arm, said guide head having a portion of its bottom surface spaced from the table so that the preform can pass under the guide head, and a vertical guide wall extending toward the forming ribs on the rollers.

2. Apparatus in accordance with claim 1 in which the guide head is wider than the support arm and a portion of the guide head projects beyond a side of the support arm, the bottom of the projecting portion of the guide head is undercut to provide the bottom surface of the guide head which is spaced from the table and the guide wall, and the guide wall extends at an angle with respect to the mounting arm.

3. Apparatus in accordance with claim 2 in which the guide member is mounted on the table with the guide head being adjacent the rollers with the guide wall extending toward the forming ribs substantially perpendicular to the longitudinal axis of the rollers, and the mounting arm extends at an angle away from the rollers toward the adjacent end of the table.

* * * * *